United States Patent [19]

Welch et al.

[11] 4,243,552

[45] Jan. 6, 1981

[54] POLYMERIZATION CATALYST AND PROCESS

[75] Inventors: Melvin B. Welch; Richard E. Dietz, both of Bartlesville, Okla.

[73] Assignee: Phillips Petroleum Company, Bartlesville, Okla.

[21] Appl. No.: 968,156

[22] Filed: Dec. 11, 1978

[51] Int. Cl.$^3$ ............................................... C08F 4/64
[52] U.S. Cl. ........................... 252/429 B; 252/429 C; 526/114; 526/125
[58] Field of Search ........................ 252/429 B, 429 C

[56] References Cited

U.S. PATENT DOCUMENTS

| | | | |
|---|---|---|---|
| 3,642,746 | 2/1972 | Kasniwa et al. | 252/429 B X |
| 3,758,621 | 9/1973 | Morikawa et al. | 252/429 B X |
| 3,953,414 | 4/1976 | Galli et al. | 252/429 B X |
| 4,013,823 | 3/1977 | Longi et al. | 252/429 B X |
| 4,107,412 | 8/1978 | Welch | 252/429 B X |
| 4,107,413 | 8/1978 | Giannini et al. | 252/429 B X |
| 4,107,415 | 8/1978 | Giannini et al. | 252/429 B X |
| 4,130,503 | 12/1978 | Foddr | 252/429 B |
| 4,143,223 | 3/1979 | Toyota et al. | 252/429 C X |

FOREIGN PATENT DOCUMENTS

| | | |
|---|---|---|
| 2143346 | 2/1973 | France . |
| 1310547 | 3/1973 | United Kingdom . |
| 1335887 | 10/1973 | United Kingdom . |
| 1489599 | 10/1977 | United Kingdom . |

*Primary Examiner*—Patrick Garvin

[57] ABSTRACT

Alpha-olefins are polymerized employing a catalyst which forms on mixing a catalyst component A formed by milling together a magnesium halide or manganous halide with selected catalyst adjuvants followed by treatment of the resulting milled product with a halogenated tetravalent titanium compound and combining the product thus formed with a cocatalyst component B comprising at least one of an organoaluminum compound and an organoaluminum monohalide with or without an aromatic ester as a part of the cocatalyst system.

21 Claims, No Drawings

POLYMERIZATION CATALYST AND PROCESS

The present invention relates to a catalyst, a method for making the catalyst, and a polymerization process employing the catalyst. In accordance with another aspect, this invention relates to an improved olefin polymerization catalyst obtained by bringing together a catalyst component A formed by grinding a magnesium halide or manganous halide with at least one catalyst adjuvant and treating the resulting product with a tetravalent titanium compound, and isolating the resulting composite (component A) which is combined with a cocatalyst system designated as catalyst component B. In accordance with a further aspect, catalyst component B comprises at least one of an organoaluminum compound and an organoaluminum monohalide with or without an aromatic ester as part of the cocatalyst system. In accordance with a further aspect, an improved polymerization catalyst comprising a component A is produced by milling a magnesium or manganese dihalide with an aryl phosphite and treating the resulting product with titanium tetrachloride and combining the resulting composite (component A) with catalyst component B comprising at least one of an organoaluminum monohalide, with or without an aromatic ester as part of the cocatalyst system, is used for the polymerization of 1-olefins such as ethylene and propylene.

In the field of catalytic polymerization of olefins such as propylene to produce useful solid polymers, a continuing objective is to increase productivity. By productivity is meant the amount of useful solid polymer that is obtained by means of a given quantity of catalytic materials. This is important because the removal of catalytic materials from the solid polymer is almost always necessary and is generally troublesome or expensive to carry out. Thus, improved polymerization processes are desired in which the productivity of the polymer per unit of the catalyst material is so great that the amount of catalyst residues remaining in the polymer is insignificant and the catalyst removal steps can be minimized or omitted. The present invention is directed to improved polymerization catalyst capable of yielding greater amounts of useable polymer per unit of catalyst in comparison with known polymerization catalysts.

Accordingly, an object of this invention is to provide an improved polymerization catalyst.

A further object of this invention is to provide an improved process for the production of olefin polymers.

A further object of this invention is to provide a catalyst system adapted to produce large quantities of solid polymer per unit of catalyst.

A further object of this invention is to provide an improved polymerization process in which the productivity of the polymer per unit of catalyst material is substantially greater than known polymerization catalysts.

Other objects, aspects, as well as the several advantages of the invention, will be apparent to those skilled in the art upon reading the specification and the appended claims.

In accordance with the invention, a catalyst is provided which forms on mixing a catalyst component A formed by milling together a magnesium halide or manganous halide with a catalyst adjuvant and treating of the resulting product with a halogenated tetravalent titanium compound and combining the resulting composite with a cocatalyst component B comprising at least one of an organoaluminum compound and an organoaluminum monohalide with or without an aromatic ester or other additive as part of the catalyst system.

In accordance with one embodiment of the invention, the catalyst adjuvants comprise selected hydrocarbyl oxides, organo phosphites, phenols, aromatic ketones, organo silanols, organo phosphates and phosphines, amines, oxygenated terpenes, carbonic acid esters, and selected organo phosphorus compounds.

Further, in accordance with the invention, alpha-olefins are polymerized under polymerization conditions employing the above catalysts.

In accordance with another embodiment of the invention, a catalyst is prepared by mixing (1) a catalyst component A formed by milling magnesium or manganese dihalide with at least one catalyst adjuvant as defined herein and treating the resulting milled product with a halogenated tetravalent titanium compound with (2) a catalyst component B comprising at least one of an organoaluminum compound and an organoaluminum monohalide with or without an aromatic ester as part of the cocatalyst system.

In accordance with a specific embodiment, catalyst component A is formed by grinding together (1) a magnesium halide or manganous halide with (2) an additive or additives to be described later, (3) treating the milled product with $TiCl_4$ neat or in solution with a solvent inert in the process, e.g., n-heptane, benzene, cyclohexane, etc., for a time sufficient to incorporate $TiCl_4$ on at least a portion of the surface thereof, and (4) washing excess $TiCl_4$ out with an inert solvent, such as n-heptane, and drying the resulting composite.

A broad range of olefins can be polymerized by the process and catalyst system of the present invention. Commercial value can be visualized presently with alpha-olefins which have from 2 to about 10 carbon atoms. The invention finds particular usefulness with either ethylene or propylene which is polymerized to produce polyethylene or polypropylene, respectively. Mixtures of the alpha-olefins can be used. High ratios of polypropylene to catalyst were obtained employing the catalyst and process of the present invention.

As indicated above, catalyst component A is formed by milling or grinding together a magnesium halide or manganous halide with suitable catalyst adjuvants. Magnesium dihalide and manganese dihalide are generally used, and magnesium dichloride is presently preferred magnesium halide.

The primary additives or catalyst adjuvants contemplated in the preparation of catalyst component A are selected from among the following types of organic compounds:

(1) $M(OR)_n$ where M is aluminum, boron, magnesium, phosphorus, titanium and zirconium; n is an integer representing the valence of M and ranges from 2–4; and R a hydrocarbyl group such as an alkyl, cycloalkyl or aryl group and combinations thereof such as alkaryl, aralkyl, etc., having from 1 to about 24 carbon atoms per molecule. Exemplary compounds include aluminum methoxide, aluminum phenoxide, aluminum benzyloxide, magnesium eicosyloxide, titanium cyclohexyloxide, zirconium isopropoxide, tri-beta-naphthyl borate, and the like. A presently preferred group of compounds are the triaryl phosphites. Exemplary compounds include triphenyl phosphite, tri-o-tolyl phosphite, tri-1-naphthyl phosphite, tri-9-anthryl phosphite, tri-4-phenanthryl phosphite, tri-p-cumenyl phosphite, tris(4-pentyl-1-naphthyl)phosphite, tris(5-decyl-2-phenanthryl)- phosphite, tris(3-cyclobutylphenyl)phosphite, tris(6-cycloheptyl-2-naphthyl)phosphite, tris[4-(2-naphthyl)-phenyl]phosphite, tris(7-phenyl-1-phenanthryl)phosphite and the like.

(2) organo phosphites of the formula

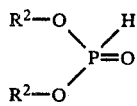

wherein $R^2$ is an aryl, aralkyl, alkaryl or haloaryl groups having from 6 to 20 carbon atoms. Exemplary compounds include diphenyl phosphite, di(4-nonylphenyl)phosphite, di(2-methylphenyl)phosphite, di(4-chlorophenyl)phosphite, di(1-naphthyl)phosphite, and the like.

(3) phenols of the formula $HOR^3$ wherein $R^3$ is an aryl group or substituted aryl group containing from 6 to about 20 carbon atoms. Exemplary compounds include phenol, 1-naphthol, 2-naphthol, 2-phenanthrol, 3-phenanthrol, 1-anthrol, 2-anthrol, 2-methylphenol, 2-chlorophenol, 2-bromophenol, 4-chlorophenol, 2,6-dichlorophenol, 3-n-tetradecylphenol, 2-isopropoxyphenol, 3-hydroxybenzyl alcohol, 2-nitrophenol, 2-cyclohexylphenol, 2-phenylphenol, 4-phenylphenol, 2,3-dimethylphenol, 2-hydroxydiphenyl, 1-methyl-2-naphthol, 5-nitro-2-naphthol, 2,6-d-t-butyl-4-methylphenol, and the like.

(4) ketones of the formula

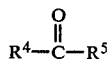

wherein $R^4$ is a thiophene, aryl, or alkyl group and $R^5$ is an aryl group containing from 6 to about 20 carbon atoms. Exemplary compounds include 2-benzoylthiophene, 3-benzoylthiophene, 2-naphthoylthiophene, benzophenone, ethyl benzyl ketone, and the like.

(5) organo silanols of the formula

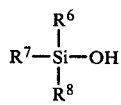

wherein $R^6$, $R^7$, $R^8$ are the same or different and are bulky substituted or unsubstituted hydrocarbyl groups containing from about 4–20 carbon atoms, e.g. aryl, alkyl and cycloalkyl group. Exemplary compounds include triphenylsilanol, tri(2-tolyl)silanol, tricyclohexyl silanol, tri(t-butyl)silanol, tribenzylsilanol, tri(t-octyl)silanol, tri(3,5-diheptylphenyl)silanol, and the like.

(6) organo phosphorus compounds of the formula

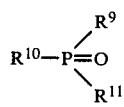

wherein each R is the same or different hydrocarbyl or hydrocarbyloxy group containing from 1 to 20 carbon atoms. Exemplary compounds include trimethyl phosphate, triisobutyl phosphate, tricycloheptyl phosphate, triphenyl phosphate, tri(3,5-diethylphenyl)phosphate, tri(4-tolyl)phosphate, trieicosyl phosphate, tri-n-decyl phosphine oxide, triphenyl phosphine oxide, tri-4-phenanthryl phosphine oxide, tris(7-phenyl-1-naphthyl) phosphine oxide and the like.

(7) amines of the formula $R^5NHR^{12}$ wherein $R^5$ is aryl group as previously defined, and $R^{12}$ is hydrogen or an aryl group of 6 to 20 carbon atoms. Exemplary compounds include aniline, diphenylamine, alpha-naphthylamine, beta, beta¹-dinaphthylamine, dibenzylamine and the like.

(8) Oxygenated terpenes selected from among carvone, dihydrocarvone, carvenone and carvomenthane.

(9) Carbonic acid esters of the formula

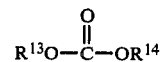

in which $R^{13}$ is a saturated or unsaturated hydrocarbyl group containing from 1 to about 12 carbon atoms selected from among alkyl, aryl, alkaryl and the like and $R^{14}$ is the same as R or hydrogen. Exemplary compounds include dimethyl carbonate, diethyl carbonate, di-t-butyl carbonate, di(2-ethylhexyl)carbonate, didodecyl carbonate, diallyl carbonate, dimethallyl carbonate, ethylene carbonate, 1,2-propylene carbonate, diethylene glycol bisallyl carbonate, dibenzyl carbonate, diphenyl carbonate and the like.

(10) Organophosphorus compounds selected from among $PX_{3-a}(OR^3)_a$,

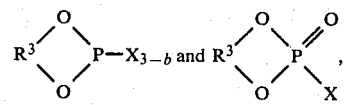

where $R^3$ is as defined previously, X is a halogen, particularly bromine, chlorine or iodine, a is 1 or 2 and b=0 or 2. Exemplary compounds include diphenylphosphorochloridate, di-1-naphthylphosphorobromidate, di-o-tolylphosphoroiodidate, phenylphosphorodichloridite, 1-anthrylphosphorodibromidite, catechylphosphotrichloride(o-phenylenephosphorotrichloridite), o-phenylenephosphorochloridite, and the like.

The molar ratios of magnesium halide and manganous halide to catalyst adjuvant additive used in forming catalyst component A can range from about 4:1 to about 100:1. The magnesium halide and manganous halide support and the catalyst adjuvant materials for catalyst component A are admixed in a suitable milling means under intensive milling conditions. The milling employed is to be distinquished from ordinary admixing, shaking, or tumbling or the like. The milling refers to the strong and thorough mixing of the solid ingredients together, milling under milling conditions, in such a manner as to afford significant reduction in the particle size. Milling can be by means of a ball mill, vibrating ball mill, tower mill, or the like. A typical, specific mill employable is a vibratory mill, such as a Vibratom, manufactured by Siebtechnik G. M. B. H.

Milling can employ ambient, vacuum or other subatmospheric, or superatmospheric, pressure, in an inert, dry atmosphere such as nitrogen, argon, or the like. Milling can result in heat being produced and where needed cooling means can be employed to avoid excessive temperatures over such as about 150° F. (65° C.) which would adversely affect catalytic performance. Milling times can range widely, such as from about 5 to about 200 hours, presently preferred from about 10 to about 175 hours because the catalysts are sufficiently activated after such milling times. No advantage in activity is gained by exceeding the specified times. Vibratory milling typically takes a shorter time than rotary ball milling.

Magnesium halide, manganous halide, preferably the chlorides, some or both, are employed substantially anhydrous, and in the form of a finely divided powder. The magnesium or manganous halide can be preactivated by a grinding operation prior to the milling step used to form component A though this preactivation is not considered generally necessary.

Usually, the anhydrous magnesium chloride or manganous chloride is added to the milling means prior to addition of the catalyst adjuvant material or additive of component A so the order of addition is not critical.

The milled product of magnesium halide or manganous halide and the catalyst adjuvant materials of catalyst component A is reacted with a titanium tetrahalide, usually the tetrachloride for convenience, at a temperature ranging from about 0° to 200° C. To improve distribution of the Ti compound the reaction can be carried out in a hydrocarbon diluent which is inert in the process as, for example, isobutane, n-heptane, cyclohexane, benzene, gasoline, and the like, for a period of time ranging from about 10 minutes to several hours, i.e., 5 hours. Suitably, if an alkane such as n-heptane is used as the diluent, the reaction can be conducted by refluxing the mixture for about 1 hour, for example. The reaction is conducted in the absence of water, and oxygen is excluded by operating with a dry gas purge, i.e. nitrogen, argon, etc.

The treated product is cooled to room temperature, the liquid decanted, and the slurry is washed with several portions of dry alkane, for example, and dried.

The Ti content of the finished catalyst generally ranges from about 0.1 to about 10 wt % based on the dry composite. This corresponds to about 0.5 to 70 mmoles titanium tetrahalide per mole of magnesium or manganous halide present.

The weight ratio of the $MgCl_2$-additive composite to the titanium tetrahalide applied thereto can range from about 0.1:1 to 10:1.

It is within the scope of the invention to utilize more than one of the defined additives in preparing catalyst component A. In addition, catalyst component A can be admixed with a diluent in particulate form such as polyethylene, polypropylene, poly(methyl methacrylate), silica, alumina, calcium carbonate and the like. If a polymer is employed, its melting or softening temperature should be higher than the reaction temperature. Suitably, the diluent is admixed with the $MgCl_2$ and additive or additives during the milling operation. The weight ratio of $MgCl_2$-additive mixture to diluent can range from about 0.1:1 to 50:1.

Catalyst component B comprises one or more organometal compounds selected from among trihydrocarbylaluminum compounds and dialkylaluminum halides. The compounds are described by the generic formulas Al $R_3$ where the R is as previously described and $(R')_2Al\ X$ wherein R' is an alkyl group containing from 1 to about 20 carbon atoms, and X is bromine, chlorine or iodine. Exemplary compounds include trimethylaluminum, triethylaluminum, trieicosylaluminum, triphenylaluminum, tribenzylaluminum, tricyclohexylaluminum, dimethylaluminum bromide, diethylaluminum chloride, dibutylaluminum iodide, dieicosylaluminum chloride, and the like.

Generally, when ethylene is to be polymerized, a single organoaluminum such as triethylaluminum or triisobutylaluminum is employed. When a branched chain 1-olefin such as propylene is to be polymerized, the catalyst system consists of a trihydrocarbylaluminum compound and preferably an aromatic ester, e.g. ethyl anisate, ethyl benzoate, etc., to improve stereospecificity and optionally a dialkylaluminum halide compound to increase polymer yields.

Particularly applicable compounds for improving stereospecificity are esters represented by the formula:

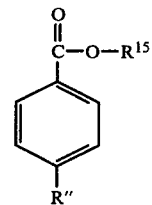

wherein $R^{15}$ represents alkyl groups having from 1 to about 4 carbon atoms and wherein R" represents monovalent radicals selected from the group consisting of —F, —Cl, —Br, —I, —OH, —OR', —OOCR', —SH, —NH₂, —NR'₂, NO₂, —CN, —CHO, —COR', —COOR', —CONH₂, CONR'₂, —SO₂R', —CF₃, —NHCOR', and hydrogen. Some examples of such compounds are ethyl benzoate, ethyl anisate (p-methoxybenzoate), ethyl p-dimethylaminobenzoate, ethyl p-fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate and mixtures thereof.

The molar ratio of $AlR_3$ to titanium compound can range from about 1:1 to 2000:1. The molar ratio of $(R')_2Al\ X$ to titanium compound can range from about 0.5:1 to 2000:1. The molar ratio of $AlR_3\ (R')_2Al\ X$ can range from about 0:1 to 100:1. The molar ratio of $AlR_3$ to aromatic ester can range from about 1:1 to 8:1. Desirably, when polymerizing propylene, a molar ratio of $AlR_3$ to $(R')_2Al\ X$ of about 0.7:1 to about 50:1 is employed.

The catalyst components can be individually introduced into the polymerization reaction zone. The desired amounts can be added directly, or flushed in with portions of diluent, as may be convenient. The particular order of addition to the polymerization reactor means does not appear to be critical. Components A and B are usually not premixed before charging to the reactor. Any order of charging can be employed.

Polymerization can be carried out under conditions known in the art, such as in a liquid phase in the presence or absence of a diluent substantially inert under the reaction conditions employed, or reactions can be carried out in the vapor phase.

It presently is preferred to polymerize propylene in liquid propylene in the absence of an inert diluent because separation of components is simplified and good results are obtained.

Ethylene presently is preferably polymerized in a diluent, though other alpha monoolefins conveniently need not be. Typical suitable diluents include n-butane, isobutane, pentane, n-hexane, n-heptane, n-octane, cyclohexane, methylcyclohexane, and the like, or other saturated aliphatic hydrocarbons, alone, or in admixture.

Polymerization temperatures employed can range widely, as convenient and desirable for the equipment, monomer, and the like. Exemplary temperatures of polymerization lie in the range of about $-80°$ C. to $150°$ C., presently preferred about $15°$ C. to $120°$ C. Polymerization temperatures can vary somewhat depending on the particular monomer, employment of diluent and the like. For example, the polymerization of propylene using liquid propylene phase conveniently is carried out in the range of about $24°$ to $80°$ C., presently preferred about $49°$ C. to $75°$ C. because of better results with regard to productivity and solubles.

Polymerization pressures can range widely, as convenient, depending on whether vapor phase or liquid phase conditions are employed, whether diluent is employed, and the like. Where liquid phase operation is desired, with or without diluent, the pressure employed should be sufficient to maintain reactants and diluent substantially in the liquid phase.

Control of the molecular weight of the polymeric product can be exerted by including small amounts of hydrogen during polymerization, and this normally is considered advantageous. The presence of hydrogen tends to decrease the molecular weight of the polymeric products.

The polymerization process can be conducted either continuously or batchwise, as may be convenient depending on desired output, equipment, and the like.

Of course, the catalyst components employed are, to some extent, sensitive to poisons, such as water, air, and the like. Equipment, diluent, alpha-monoolefin, and the like all should be maintained in substantially anhydrous conditions or dried prior to employment. An atmosphere inert to the components should be maintained in substantially anhydrous conditions or dried prior to employment. An atmosphere inert to the components should be employed, such as nitrogen, argon, helium, n-hexane, and the like. Polymerization starts almost immediately on combination of the catalyst components with the monomer and is generally terminated within about two hours.

After completion of the polymerization reaction, or after suitable residence time in the reaction zone to obtain desired conversion, the contents of the reactor means then are discharged. The catalyst can be inactivated by treating with an agent such as a lower alcohol such as ethanol or methanol, the mixture then separated, and the polymer isolated. The polymer recovered can be purified as desired by such as drying under vacuum, and the like. The polymeric product can be treated for removal of solubles by contacting with n-hexane, n-heptane, etc., which dissolves the soluble amorphous material and leaves a white, solid, predominantly crystalline polymer as the final product.

EXAMPLE I

Two series of catalyst component A were prepared by intensive ball milling of anhydrous magnesium chloride with the specified additive. After recovery, each composite was individually treated with titanium tetrachloride, washed, and recovered. The additive employed in the first series was triphenyl phosphite and in the second series was phenol. Each sample in the first series was prepared by charging a one-liter stainless steel vessel with 108 g magnesium chloride, 2000 g of $\frac{1}{2}''$ (1.3 cm) steel balls, and a specified quantity of additive. Each sample was subjected to milling for 24 hours with a cooling tap water spray on the outside of the vessel by employing a Vibratom vibratory mill, Model 6L-b, a product of Siebtechnik GMBH, Mulheim, West Germany, which operated at a frequency of 1,760 cycles per minute at an amplitude of about 9 mm.

Of the eight samples prepared with triphenyl phosphite, one was milled with 16.5 g of the phosphite and the remainder with 18.9 g of the phosphite. Thus, the calculated mole ratio of $MgCl_2$ to phosphite was 21:1 for the one sample and 18.6:1 for the remainder. The calculated $MgCl_2$ to phosphite mole ratio of the combined samples was 19:1.

Nine $MgCl_2$-phenol milled samples were prepared in the manner previously described for the $MgCl_2$-phosphite milled samples by charging to the milling vessel in each instance 100 g of dry $MgCl_2$, 14 g of phenol, and 2,000 g of steel balls. The calculated mole ratio of $MgCl_2$:phenol for each sample was 7:1.

While under a dry nitrogen purge, each milled sample was charged to a vessel equipped for stirring and refluxing, to which was added 40 ml (69.04 g) of titanium tetrachloride and 250 ml of dry n-heptane. The stirred mixture was refluxed for one hour (about $100°$ C.). After the reaction period, stirring was discontinued, the mixture was cooled to about room temperature, and the supernatant liquid removed by decanting. The product (slurry) was washed to remove unreacted titanium tetrachloride by contact with a 250 ml portion of dry n-hexane while being stirred. Stirring was discontinued, the solids left to settle, and the supernatant liquid removed by decanting. The washing process was repeated using a 250 ml portion of dry n-pentane as the contacting liquid. After decanting the supernatant liquid, the product was dried over a warm water bath, $50°$ C., in a current of dry nitrogen. Each catalyst component thus prepared was tested for propylene polymerization by charging a portion thereof to a reactor as detailed below with triethylaluminum (TEA) and ethyl anisate (EA) as the cocatalyst system. The unused portions of the catalyst samples were combined and mixed to form a composite sample for later use.

To a dry, stirred, stainless steel reactor of one gallon (3.8 liter) capacity at $70°$ C. was charged in order under a gaseous propylene purge 5.4 mmoles TEA as a 15 weight percent solution in dry n-heptane, 1.6 mmoles EA, and catalyst component A. The reactor was sealed, hydrogen added from a 360 ml bomb [delta pressure of 40 psig (276 kPa) on the bomb] and about 1.9 liters of liquid propylene was charged. The reactor temperature was adjusted to $70°$ C., and the reactor filled liquid full with additional liquid propylene. The liquid full condition was maintained during each one-hour polymerization run by adding more propylene as required.

Each run was terminated by injecting a 10 ml portion of methanol to the reactor, and the reactor and contents cooled to about room temperature. The reactor was drained, and the solid polymer recovered, dried, and weighed. Soluble polymer in the liquid propylene effluent was determined by flashing off the propylene and weighing the dried residue. The xylene-soluble polymer content of the solid polymer was determined by adding a weighed amount of the polymer to heated xylene at approximately 125° F. and determining the amount of polymer precipitated from solution after cooling the mixture to room temperature. The difference represents the xylene-soluble polymer.

Several runs (2-7) were conducted in a stirred, stainless steel reactor of 1-liter capacity following the same procedure enumerated for the 3.8 liter reactor except for charging the reactor at room temperature (23° C.) and a reduction in the quantities charged to the reactor. However, the polymer produced was isolated by venting unreacted propylene. Thus the recovered polymer contained propylene-soluble polymer, as well as propylene-insoluble polymer. Resulting determination of soluble polymer by xylene in this instance yields a value which includes xylene-soluble material, as well as propylene-soluble material.

Analysis of the combined MgCl$_2$-triphenyl phosphite milled samples showed it contained 1.65 weight percent titanium (equivalent to 6.53 weight percent TiCl$_4$, the basis used for calculations involving TiCl$_4$ and TEA) and 19.9 weight percent magnesium. The MgCl$_2$-phenol samples were not combined into one composite or analyzed. However, a calculated Ti content based on six samples was about 2.4 weight percent. Three samples (those in Runs 10, 11, and 17 of Table 1) were excluded from the calculation because each sample weight after the titanium tetrachloride treatment was less or about the same as the sample weight prior to the treatment. The calculated 2.4 weight percent Ti is equivalent to 9.5 weight percent TiCl$_4$. This is the basis for calculations involving TiCl$_4$ and TEA.

The amount of catalyst component A employed in each run, calculated amount of TiCl$_4$ present, calculated TiCl$_4$:TEA mole ratio, polymer yields, and calculated productivities based on grams polymer obtained per g catalyst component A are given in Table 1. Calculated productivity for "solid" polymer represents that insoluble polymer recovered from the 3.8 liter reactor. Calculated productivity for total polymer includes the solid recovered polymer plus recovered propylene-soluble polymer.

TABLE 1

| Run No. | Additives | Cat. Component A charged mg. | Cat. Component A calc. mg. | Cat. Component A TiCl$_4$ mmoles | Propylene Polymerization Calculated TEA/TiCl$_4$ mole ratio | Polymer yield, g solid | Polymer yield, g propylene soluble | Calculated Productivity solid | Calculated Productivity total | Soluble Polymer, wt % xylene | Soluble Polymer, wt % propylene | Soluble Polymer, wt % combined |
|---|---|---|---|---|---|---|---|---|---|---|---|---|
| 1 | triphenyl-phosphite | 49.8 | 3.25 | 0.017 | 3.8 | 346 | 13 | 6950 | 7210 | 5.2 | 3.6 | 8.8 |
| 2 | " | 9.7 | 0.63 | 0.003 | 1000 | 85.4 | — | — | 8800 | — | — | 10.0 |
| 3 | " | 7.2 | 0.47 | 0.002 | 1500 | 65.7 | — | — | 9120 | — | — | 11.1 |
| 4 | " | 8.8 | 0.57 | 0.003 | 1000 | 91.5 | — | — | 10400 | — | — | 14.2 |
| 5 | " | 10.2 | 0.67 | 0.004 | 750 | 95.4 | — | — | 9350 | — | — | 14.0 |
| 6 | " | 10.9 | 0.71 | 0.004 | 750 | 103.6 | — | — | 9500 | — | — | 10.3 |
| 7 | " | 9.7 | 0.63 | 0.003 | 1000 | 94.1 | — | — | 9700 | — | — | 9.2 |
| 8 | " | 29.5 | 1.93 | 0.010 | 540 | 201 | 8 | 6820 | 7080 | 5.3 | 3.8 | 9.1 |
| Average | triphenyl-phosphite | | | | | na | na | na | 8890 | na | na | 10.8 |
| 9 | phenol | 45.9 | 4.36 | 0.023 | 235 | 463 | 16 | 10100 | 10400 | 7.1 | 3.3 | 10.4 |
| 10 | " | 42.8 | 4.07 | 0.021 | 257 | 239 | 6 | 5580 | 5720 | 4.9 | 2.4 | 7.3 |
| 11 | " | 39.4 | 3.74 | 0.020 | 270 | 442 | 15 | 11200 | 11600 | 6.3 | 3.3 | 9.6 |
| 12 | " | 37.1 | 3.52 | 0.019 | 284 | 350 | 15 | 9440 | 9840 | 6.6 | 4.1 | 10.7 |
| 13 | " | 36.2 | 3.44 | 0.18 | 300 | 329 | 15 | 9090 | 9500 | 6.3 | 4.3 | 10.6 |
| 14 | " | 48.4 | 4.60 | 0.024 | 225 | 421 | 17 | 8700 | 9050 | 6.3 | 3.9 | 10.2 |
| 15 | " | 56.3 | 5.35 | 0.028 | 193 | 594 | 28 | 10500 | 11000 | 6.6 | 4.5 | 11.1 |
| 16 | " | 40.0 | 3.80 | 0.020 | 270 | 287 | 14 | 7170 | 7520 | 6.3 | 4.7 | 11.0 |
| 17 | " | 39.8 | 3.78 | 0.020 | 270 | 384 | 18 | 9650 | 10100 | 6.2 | 4.5 | 10.7 |
| Averge | phenol | | | | | 390 | 16 | 9050 | 9400 | 6.3 | 3.9 | 10.2 |

Notes:
Runs 2-7, TEA was 3 mmoles, EA was 0.8 mmoles. Reactor capacity was 1 liter.
Polymer recovered included propylene solubles.
Xylene soluble polymer included all soluble polymers.
The dashes indicate that individual determination of propylene soluble polymer, calculated productivity for solid polymer, xylene soluble polymer, and propylene soluble polymer is not made with this reactor porudct.
na means not applicable because of process differences with two reactors employed.

Inspection of the data indicates that the invention catalysts employing either triphenyl phosphite or phenol in catalyst component A were very active for propylene polymerization and that soluble polymer formation was relatively low. Replicate run data are presented to show that, generally, reproducibility of polymerization results with either catalyst component A present are very good.

EXAMPLE II

A series of comparison catalysts was prepared to show that milling together McCl$_2$ and triphenyl phosphite or phenol and treating the product with TiCl$_4$ is required in order to obtain very active propylene polymerization catalyst components.

Catalyst A: 9.4 g of milled MgCl$_2$ was added to a dry flask equipped for stirring and refluxing under a dry nitrogen purge. To the flask was added 250 ml of dry n-heptane and 3 ml (3.5 g) of triphenyl phosphite. The stirred mixture was heated to refluxing temperature for one hour and the mixture then cooled in the absence of stirring. The supernatant liquid was decanted and about an equal quantity of dry n-hexane was added, mixed with the slurry and the solids allowed to settle. The supernatant liquid was removed by decanting and about an equal portion of dry n-hexane added back along with 20 ml (34.5 g) of titanium tetrachloride. The mixture was refluxed for one hour, then washed and isolated as described in Example I.

Catalyst B: A mixture was obtained by ball milling 15 g dry MgCl$_2$ [250 ml stainless steel vessel with 400 g of $\frac{3}{8}''$ (0.95 cm) steel balls] and 0.6 cc (1.04 g) TiCl$_4$ in the manner previously described for 24 hours. The calculated mole ratio of MgCl$_2$:TiCl$_4$ was 28.7. 13.4 g of the product was added to a dry flask as in the manner used for Catalyst A. To the flask was added 250 ml of dry n-heptane and 2.0 ml (2.4 g) of triphenyl phosphite. The mixture was heated to refluxing temperature for one hour, then cooled, washed, and recovered as before.

Catalyst C: 10.2 g of milled $MgCl_2$ was added to a dry flask as before along with 50 g of phenol, the mixture heated to refluxing temperature for one hour, cooled, and washed with two 250 ml portions of dry xylene. The xylene, in each instance away boiled was to remove it. The product was washed with two 250 ml portions of dry n-hexane, each portion was also removed from the mixture by boiling. Then 250 ml of dry heptane and 20 ml (34.5 g) $TiCl_4$ was added, the mixture refluxed for one hour, washed with a 250 ml portion of dry n-hexane, and two 250 ml portions of dry n-pentane. Each wash solution was evaporated away. The product was finally dried over a warm water bath.

Catalyst D: A mixture was obtained by ball milling 15 g dry $MgCl_2$ and 2 g benzyl alcohol for 24 hours as previously described. The calculated $MgCl_2$:benzyl alcohol mole ratio was 8.5:1. In the manner described before, 15.2 g of the product was charged to a flask along with 250 ml of dry n-heptane and 20 ml of titanium tetrachloride. After refluxing one hour, the mixture was washed, and the product washed and recovered as in Example I.

Catalyst E: A mixture was obtained by ball milling 15 g dry $MgCl_2$ and 2 g triphenyl phosphine for 24 hours as previously described. 16.0 g of the product was treated and recovered as described for Catalyst D. The calculated $MgCl_2$-triphenyl phosphine mole ratio was 20.7:1.

Catalyst F: A mixture was obtained by ball milling 15 g dry $MgCl_2$, 2.4 g of triphenyl phosphite, and 0.5 g $TiCl_4$ for 24 hours. The calculated $MgCl_2$:triphenyl phosphite mole ratio was 20.8.

Catalyst G: 15 g of milled $MgCl_2$ was added to a dry flask equipped for stirring and refluxing under a dry nitrogen purge. To the flask was added 250 ml of dry n-heptane and 20 ml (34.5 g) of titanium tetrachloride. The stirred mixture was heated to refluxing temperature for one hour and then cooled to room temperature in the absence of stirring. The solids that settled were recovered by washing and drying as described in Catalyst C.

Each catalyst was used to polymerize propylene in the manner described in the first example using the same quantities of TEA, EA, and hydrogen as in Example I.

The amounts of catalysts charged, mole ratios employed, and results obtained are given in Table 2.

activity for propylene polymerization, and moreover produced much soluble polymer (about 19 wt %).

Run 1 shows that merely contacting $MgCl_2$ with triphenyl phosphite, isolating the product, and treating it with $TiCl_4$ is not equivalent to intensively ball milling $MgCl_2$ and triphenyl phosphite before the $TiCl_4$ treatment. Thus, calculated productivity for solid polymer recovered from the reactor in control run was 622 g polymer per g catalyst component A versus 6950 g polymer per g catalyst for the invention catalyst of run 6.

Run 3 shows that refluxing a milled mixture of $MgCl_2$ and $TiCl_4$ with triphenyl phosphite, and recovering the product yields a catalyst which is somewhat more active for propylene polymerization than shown in run 1 (calculated productivity of about 1500 g solid polymer per g catalyst component A) but still far below the 6950 g figure of the invention catalyst.

Run 3 is a comparison with the invention catalyst of run 7, and demonstrates that ball milling $MgCl_2$ and phenol followed by a $TiCl_4$ treatment yields a far more active catalyst than merely refluxing $MgCl_2$ and phenol followed by the $TiCl_4$ treatment. Thus, calculated productivity of solid polymer per g catalyst component A was about 7200 for the invention catalyst versus almost zero for the comparison catalyst.

The comparison catalyst component A made by ball milling $MgCl_2$ and benzyl alcohol and used in propylene polymerization in run 4 shows that benzyl alcohol is not equivalent to phenol in the instant invention, although it yields a relatively active catalyst. Not only is the calculated productivity of solid polymer per g catalyst component A shown in comparison run 4 substantially less (1100 g. vs. 7170 g of run 7), but the amount of soluble polymer is more than double that of run 7 (22.9 g vs. 11.0 g).

The results shown in run 5 show that ball milling $MgCl_2$ and triphenyl phosphine yields a catalyst after $TiCl_4$ treatment that is active; that is, calculated solid polymer per g catalyst component A is about 2900 g and about 14 wt % soluble polymer. Although a good catalyst is made in the fashion of this invention with triphenyl phosphine, the results shown in run 6 with triphenyl phosphite indicate that the triaryl phosphites are more preferred than the triaryl phosphines in preparing catalyst component A of this invention.

The results obtained in run 8 demonstrates that catalyst component A which is obtained by ball milling

TABLE 2

| | Catalyst Component A | | Cocatalyst, mmoles | | Polymer yield, g | | Calculated Productivities | | Soluble Polymer wt % | | | |
|---|---|---|---|---|---|---|---|---|---|---|---|---|
| Run No. | Catalyst | Charged mg | TEA | EA | solid | propylene soluble | solid | total | xylene | prop- ylene | com- bined | Remarks |
| 1 | A | 38.6 | 5.4 | 1.6 | 24 | 0 | 622 | 622 | 7.2 | 0 | 7.2 | comparison |
| 2 | B | 39.0 | " | " | 58 | 6 | 1490 | 1640 | 4.0 | 9.4 | 13.4 | " |
| 3 | C | 41.9 | " | " | traces | 2 | — | — | — | — | — | " |
| 4 | D | 48.3 | " | " | 53 | 7 | 1100 | 1240 | 11.2 | 11.7 | 22.9 | " |
| 5 | E | 39.5 | " | " | 115 | 10 | 2910 | 3160 | 5.7 | 8.0 | 13.7 | invention |
| 6(a) | — | 49.8 | " | " | 318 | 13 | 6950 | 7210 | 5.2 | 3.6 | 8.8 | " |
| 7(b) | — | 40.0 | " | " | 287 | 14 | 7170 | 7520 | 6.3 | 4.7 | 11.0 | " |
| 8 | F | 45.8 | " | " | 110 | 5 | 2400 | 2500 | 3.6 | 4.4 | 8.0 | comparison |
| 9 | G | 44.0 | " | " | 18 | 2.3 | 410 | 460 | 7.6 | 11.3 | 18.9 | control |

Notes:
(a)Run 6 is the same as run 1 of Example I, triphenyl phosphite additive.
(b)Run 7 is the same as run 16 of Example I, phenol additive.

The results given in Table 2 indicate in run 9 that treating $MgCl_2$ with $TiCl_4$ yields a catalyst that has low $MgCl_2$, triphenyl phosphite, and $TiCl_4$ forms a relatively good catalyst. However, catalyst productivity is calculated as 2400 g solid polymer per g catalyst component A compared to the invention catalyst component A containing triphenyl phosphite and MgCl$_2$ followed by a TiCl$_4$ treatment which produced 7200 g polymer per g catalyst component A.

previously described in conjunction with 5.4 mmoles TEA and 1.6 mmoles EA.

The mole ratio of each MgCl:additive prepared, amounts of catalyst component A charged, and results obtained are presented in Tables 3A and 3B. Two tables are used for easier comprehension.

TABLE 3A

Propylene Polymerization

| | | Catalyst Component A | | | Polymer yield, g | | Calculated Productivity | | Soluble Polymer, wt % | | |
|---|---|---|---|---|---|---|---|---|---|---|---|
| Run No. | Additive used | mole ratio MgCl$_2$: additive | wt ratio MgCl$_2$/ additive to TiCl$_4$ | Component A charged mg. | solid | soluble | solid | total | xylene | propylene | combined |
| 1 | triphenoxyaluminum | 24 | 0.49 | 69.3 | 440 | 22 | 6350 | 6670 | 5.1 | 4.8 | 9.9 |
| 2 | triphenylborate[a] | 23 | 0.47 | 34.9 | 74 | 6 | 2120 | 2290 | 7.5 | 7.5 | 15.0 |
| 3 | triphenyl phosphite | 19 | 1.7 | 34.9 | 377 | 15 | 10880 | 11200 | 7.0 | 3.8 | 10.8 |
| 4 | diphenyl phosphite | 15 | 0.46 | 44.0 | 344 | 13 | 7820 | 8110 | 5.9 | 3.6 | 9.5 |
| 5 | p-phenylphenol | 13 | 0.43 | 39.4 | 302 | 18 | 7660 | 8120 | 5.9 | 5.6 | 11.5 |
| 6 | p-chlorophenol | 10 | 0.61 | 46.7 | 291 | 15 | 6230 | 6550 | 6.1 | 4.9 | 11.0 |
| 7 | p-methylphenol | 16 | 0.41 | 39.7 | 223 | 14 | 5620 | 5970 | 5.4 | 5.9 | 11.3 |
| 8 | 2-cyclohexylphenol | 14 | 0.45 | 49.2 | 273 | 14 | 5550 | 5830 | 4.0 | 3.5 | 7.5 |
| 9 | BHT[b] | 17 | 0.45 | 41.7 | 189 | 9 | 4530 | 4750 | 5.0 | 4.5 | 9.5 |
| 10 | Hindered phenolic[c] | 60 | 0.45 | 45.8 | 165 | 13 | 3600 | 3890 | 7.0 | 7.3 | 14.3 |
| 11 | 2-naphthol | 11 | 0.46 | 41.5 | 240 | 14 | 5780 | 6120 | 6.0 | 5.5 | 11.5 |
| 12 | 1-naphthol | 11 | 0.59 | 43.9 | 213 | 14 | 4850 | 5170 | 6.2 | 6.2 | 12.4 |
| 13 | 2-benzoylthiophene | 15 | 0.46 | 44.9 | 173 | 10 | 3850 | 4080 | 3.8 | 5.5 | 9.3 |
| 14 | triphenylsilanol | 22 | 0.46 | 38.8 | 193 | 11 | 4970 | 5260 | 5.9 | 5.4 | 11.3 |

Notes:
[a]analyzed Ti component of catalyst component A is 1.84 wt %.
[b]2,6-di-t-butyl-4-methylphenol
[c]di-n-octadecyl(3,5-di-t-butyl-4-hydroxybenzyl)phosphonate

TABLE 3B

Propylene Polymerization

| | | Catalyst Component A | | | Polymer yield, g | | Calculated Productivity | | Soluble Polymer, wt % | | |
|---|---|---|---|---|---|---|---|---|---|---|---|
| Run No. | Additive used | mole ratio MgCl$_2$: additive | wt ratio MgCl$_2$/ additive to TiCl$_4$ | Component A charged mg. | solid | soluble | solid | total | xylene | propylene | combined |
| 15 | triphenylphosphine oxide | 14 | 0.39 | 44.4 | 207 | 9 | 4660 | 4860 | 5.5 | 4.2 | 9.7 |
| 16 | triphenyl phosphate[a] | 26 | 0.46 | 44.1 | 54 | 8 | 1220 | 1410 | 6.4 | 12.9 | 19.3 |
| 17 | triphenyl phosphate[b] | 26 | 0.45 | 37.8 | 201 | 9 | 5320 | 5560 | 4.6 | 4.3 | 8.9 |
| 18 | d-carvone | 12 | 0.46 | 41.2 | 280 | 13 | 6800 | 7110 | 4.9 | 4.4 | 9.3 |
| 19 | 1-carvenone | 17 | 0.45 | 34.1 | 69 | 8.3 | 2020 | 2270 | 9.6 | 10.7 | 20.3 |
| 20 | diethyl carbonate | 10 | 0.46 | 35.8 | 176 | 5.2 | 4920 | 5060 | 4.8 | 2.9 | 7.7 |
| 21 | diphenylamine | 13 | 0.47 | 38.7 | 145 | 10.9 | 3750 | 4030 | 8.2 | 7.0 | 15.2 |
| 22 | catechylphosphotrichloride | 18 | 0.46 | 42.6 | 205 | 10.4 | 4810 | 5060 | 5.5 | 4.8 | 10.3 |
| 23 | diphenylphosphorochloridate | 12 | 0.47 | 39.1 | 226 | 9 | 5780 | 6010 | 4.8 | 3.8 | 8.6 |
| 24 | phenylphosphorodichloridite | 10 | 0.50 | 43.7 | 287 | 9.8 | 6510 | 6790 | 6.3 | 3.3 | 9.6 |
| 25 | o-phenylenephosphorochloridate | 14 | 0.45 | 38.6 | 178 | 10.3 | 4610 | 4880 | 5.3 | 5.8 | 11.1 |
| 26 | 2-phenylphenol | 9 | 0.49 | 35.4 | 329 | 339 | 9290 | 9580 | 4.6 | 2.9 | 7.5 |

Notes:
[a]TiCl$_4$ treatment with n-heptane diluent at 100° C. for 1 hour. Analyzed Ti content of catalyst component A is 1.42 wt %.
[b]TiCl$_4$ treatment with Soltrol® 130 diluent at 130° C. for 1 hour. (Soltrol 130 is a paraffin mixture boiling at about 130° C.) Analyzed Ti content of catalyst component A is 1.45 wt %.

EXAMPLE III

A series of invention catalyst component A's were prepared by ball milling dry MgCl$_2$ with a specified additive for 24 hours as described before. Unless otherwise specified, the compositions were prepared by ball milling 15 g dry MgCl$_2$ with 2 g or 2 ml of the additive. Each recovered product was then refluxed with TiCl$_4$ in the presence of n-heptane (unless otherwise indicated) for 1 hour, and the final product washed and recovered as previously described.

Each catalyst component A was used in propylene polymerization using a 3.8 liter reactor in the manner The additives used in preparing catalyst component A are presented in Tables 3A, 3B in the general order given in the preliminary discussion. The results obtained, based on an arbitrary calculated productivity of the solid polymer obtained of at least about 4,500 g polymer per g catalyst component A disclose that triphenyl phosphite, Run 3 (repeated for emphasis), diphenyl phosphite in Run 3, triphenoxyaluminum of Run 1, the substituted phenols of Runs 5-9, and naphthols of Runs 11-12, triphenylsilanol of Run 14, triphenylphosphine oxide of Run 15, triphenyl phosphate of Run 17, d-carvone of Run 18, diethyl carbonate of Run 20, and the organic phosphorus and chlorine compounds of Runs 22–25, all yield superior catalysts when prepared in the manner of this invention. The other additives employed also yield active catalyst components although their activity is somewhat less than the more preferred additives previously enumerated. These additives are triphenylborate of Run 2, di-n-octadecyl(3,5-t-butyl-4-hydroxybenzyl)phosphate of Run 10, 2-benzoylthiophene of Run 13, 1-carvenone of Run 19, and diphenylamine of Run 21.

Propylene was polymerized as described in the first example using 5.4 mmoles of TEA and 1.6 mmoles EA as the cocatalyst system.

The additives and ratios employed in preparing catalyst component A and results obtained are given in Table 4.

TABLE 4

Propylene Polymerization

| | Component A | | | | | | | | | | | | |
|---|---|---|---|---|---|---|---|---|---|---|---|---|---|
| | | Wt. ratio $MgCl_2$ + additive to diluent | Wt. ratio $MgCl_2$ + additive + diluent to $TiCl_4$ | Wt. ratio additive to diluent | Component A charged, mg | Cocatalyst molecules | | Polymer yield, g | | Calculated Productivity | | Soluble Polymer, wt. percent | | |
| Run No. | Additives used | | | | | TEA | EA | solid | propylene-soluble | solid | total | xylene | propylene | comb. |
| 1 | A | 17 | 0.47 | 2.4 | 38.2 | " | " | 233 | 13 | 6100 | 6440 | 6.2 | 5.3 | 11.5 |
| 2 | B | 5.8 | 0.45 | 0.80 | 38.7 | " | " | 430 | 20 | 11100 | 11600 | 6.4 | 4.5 | 10.9 |
| 3 | B | 2.3 | 0.44 | 0.39 | 36.1 | " | " | 363 | 15.8 | 10100 | 10500 | 6.8 | 4.2 | 11.0 |
| 4 | B | 1.2 | 0.45 | 0.26 | 37.7 | " | " | 133 | 10.7 | 3530 | 3810 | 8.7 | 7.4 | 16.1 |
| 5 | B | 0.7 | 0.44 | 0.20 | 28.0 | " | " | 22 | 3 | 786 | 893 | 9.7 | 12.8 | 22.5 |
| 6 | B | 0.25 | 0.43 | 0.15 | 35.7 | " | " | trace | — | — | — | — | — | — |
| 7 | B | 0.13 | 0.26 | 0.13 | 39.6 | " | " | 0 | — | — | — | — | — | — |

Note:
Additive A - triphenylphosphite, polymethylacrylate. Diluent is polymethylacrylate.
Additive B - phenol, calcium carbonate. Diluent is calcium carbonate.

EXAMPLE IV

As described in Example I, catalyst component A was prepared by ball milling 15 g anhydrous $MgCl_2$ with 2.4 g triphenyl phosphite for 24 hours. Thus, the mole ratio of $MgCl_2$ to the phosphite was 20.8. As before, the recovered product was refluxed with 34.5 g of $TiCl_4$ and 250 ml of dry n-heptane for one hour. The reaction product after washing and drying as before was found by analysis to contain 1.91 weight percent titanium. This is equivalent to a calculated $TiCl_4$ content of 7.6 weight percent.

Propylene was polymerized as described in Example I, except that a cocatalyst system containing 5.4 mmoles triethylaluminum, 1.6 mmoles ethyl anisate, and 0.2 mmoles diethylaluminum chloride were employed. A polymerization time of 2.5 hours was used. 20.4 mg of catalyst component A was charged to the reactor in this run.

Recovered solid polymer was found to weigh 346 g, and recovered propylene soluble polymer was found to weigh 10 g. Calculated productivity of solid polymer over the 2.5 hour run was found to be 16,960 g polymer per g catalyst component A. The xylene soluble polymer produced was 5.0 wt %, and propylene soluble polymer was 2.8 wt %.

This polymerization run represents a method in which catalyst productivity is high (based on catalyst component A), and soluble polymer formation is low. It is seen that the catalyst system employed retains good activity over the 2.5 hour polymerization run time used.

EXAMPLE V

Catalyst components A in this Example were prepared as described in Example I, except that two additives were employed in each preparation. One of the additives used was a diluent.

$CaCO_3$ used as a diluent has the advantage that productivities can be increased without significantly increasing solubles. For instance, calculated productivities for the runs in Table 4 which incorporate $CaCO_3$ have the following productivities based on g polymer/g catalyst excluding $CaCO_3$:

| Run | Total | Total excluding $CaCO_3$ |
|---|---|---|
| 2 | 11,600 | 13,650 |
| 3 | 10,500 | 15,000 |
| 4 | 3,810 | 6,930 |
| 5 | 890 | 2,220 |
| 6 | — | — |
| 7 | — | — |

Compare Run 3, 15,000 g/g productivity and 11 weight percent total solubles with averages of phenol runs, 9–17, of Table 1, 9,400 productivity and 10.2 weight percent total solubles.

The results in Table 4 in Run 1 show that a polymeric diluent such as poly(methyl methacrylate) can be used to advantage in preparing catalyst component A to yield an active catalyst. The calcium carbonate diluent employed in preparing catalyst component A in Runs 2–7 was found to be beneficial, e.g., very active catalysts resulted, providing a weight ratio of $MgCl_2$ plus additive to diluent of about 2 or higher was employed. When the weight ratio fell below about 2, catalyst productivity diminished and fell to near zero at a $MgCl_2$ plus additive to diluent weight ratio of about 0.25. These results demonstrate that $MgCl_2$ forms an essential part of the active catalyst system of this invention. In general, the diluent helps to provide a more free-flowing catalyst.

EXAMPLE VI

Some of the catalyst component A samples used in propylene polymerization were also tested for ethylene polymerization. In these runs, a 3.8 liter reactor similar to that employed in propylene polymerization was employed.

Polymerization procedure consisted of heating the reactor containing about 3 liters of dry n-heptane to 175° C. for about 30 minutes. The reactor was drained, residual n-heptane purged by means of a stream of dry nitrogen and the closed reactor cooled to room temperature while under nitrogen. The cooled reactor was purged with isobutane vapor, 2.7 mmoles of TEA as a 15 wt % solution in n-heptane added, and a catalyst component A charged. The reactor was closed, 2 liters of isobutane were charged, the reactor and contents were heated to 80° C., and 100 psig (0.69 MPa) ethylene pressure admitted. Additional ethylene was charged as required during polymerization to maintain the pressure. Following each 1 hour run, the run was terminated by venting the ethylene and isobutane, and the polymer recovered and weighed.

The additives employed, amount of catalyst component A charged to the reactor in each run, and results obtained are given in Table 5.

TABLE 5

| Catalyst Component A Prior Description | | Present Run | Catalyst Component A | | Reactor Pressure | | Polymer Yield | Calculated Productivity g solid polymer/g catalyst |
|---|---|---|---|---|---|---|---|---|
| Table | Run | Run No. | Additive(s) employed | Charged to Reactor, mg | psi | MPa | g | Component A |
| 3A | 1 | 1 | triphenoxyaluminum | 35.4 | 280 | 1.93 | 602 | 17,000 |
| 3A | 3 | 2 | triphenylphosphite | 10.5 | 275 | 1.90 | 163 | 15,500 |
| 3A | 4 | 3 | diphenylphosphite | 18.6 | 290 | 2.00 | 439 | 23,600 |
| 3A | 11 | 4 | 2-naphthol | 17.1 | 290 | 2.00 | 421 | 24,600 |
| 1 | 11 | 5 | phenol | 24.3 | 265 | 1.83 | 449 | 18,500 |
| 3A | 14 | 6 | triphenylsilanol | 19.2 | 290 | 2.00 | 296 | 15,400 |
| 3A | 13 | 7 | 2-benzoylthiophene | 27.0 | 290 | 2.00 | 598 | 22,100 |
| 3A | 10 | 8 | di-n-octadecyl(3,5-di-t-butyl-4-hydroxybenzyl) phosphonate | 26.2 | 300 | 2.07 | 275 | 10,500 |
| 2 | 4 | 9 | benzyl alcohol | 11.4 | 290 | 2.00 | 224 | 19,600 |
| 5 | 4 | 10 | phenol, calcium carbonate | 15.8 | 280 | 1.93 | 498 | 31,500 |
| 5 | 5 | 11 | phenol, calcium carbonate | 21.6 | 280 | 1.93 | 762 | 35,300 |
| 5 | 6 | 12 | phenol, calcium carbonate | 14.2 | 280 | 1.93 | 381 | 26,800 |
| 5 | 7 | 13 | phenol, calcium carbonate | 18.0 | 280 | 1.93 | 298 | 16,600 |
| 5 | 8 | 14 | phenol, calcium carbonate | 35.0 | 290 | 2.00 | 58 | 1,660 |
| 5 | 9 | 15 | phenol, calcium carbonate | 77.1 | 290 | 2.00 | 4 | 52 |
| | | 16 | 2-chlorophenol | 17.1 | 280 | 1.93 | 891 | 52,100 |

Again, the beneficial effect of adding $CaCO_3$ on polymer productivity based on g polymer/g catalyst excluding $CaCO_3$ should be emphasized.

| Run | g/g catalyst | g/g catalyst excluding $CaCO_3$ |
|---|---|---|
| 10 | 31,500 | 37,100 |
| 11 | 35,300 | 50,400 |
| 12 | 26,800 | 48,700 |
| 13 | 16,600 | 41,500 |
| 14 | 1,660 | 8,300 |
| 15 | 52 | — |

This compares to run 5 with a productivity of 18,500 g/g catalyst.

The results demonstrate that the various catalyst component A's that were active in propylene polymerization are also active in ethylene polymerization. Runs 10–15 were made using a calcium carbonate diluent in catalyst component A of varying amounts. The results show in runs 10–13 that a weight ratio of $MgCl_2$-additives to calcium carbonate of at least about 0.7:1 is required to obtain an active ethylene polymerization catalyst.

We claim:

1. A catalyst which forms on mixing:

A. a catalyst component A formed by milling
 (1) a magnesium halide or manganous halide with
 (2) at least one catalyst adjuvant selected from
  (a) hydrocarbyl metal oxides of the formula $M(OR)_n$ wherein M is aluminum, boron, magnesium, titanium or zirconium, n is an integer representing the valence of M and ranges from 2–4, and R is a hydrocarbyl group having from 1 to 24 carbon atoms per molecule,
  (b) organo phosphites of the formula

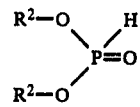

wherein $R^2$ is an aryl, aralkyl, alkaryl or haloaryl having from 6 to 20 carbon atoms,
  (c) aromatic phenols of the formula $HOR^3$ wherein $R^3$ is an aryl group containing from 6 to about 20 carbon atoms,
  (d) aromatic ketones of the formula

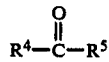

wherein $R^4$ is a thiophene, aryl or alkyl group and $R^5$ is an aryl group containing from 6 to 20 carbon atoms,
  (e) organo silanols of the formula

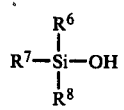

wherein $R^6$, $R^7$, $R^8$ are the same or different and are hydrocarbyl groups containing from 4–20 carbon atoms,
  (f) organo phosphates and phosphines of the formula

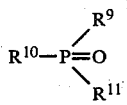

wherein each R is the same or different hydrocarbyl or hydrocarbyloxy group containing from 1 to 20 carbon atoms, (g) oxygenated terpenes selected from among carvone, dihydrocarvone, carvenone and carvomenthane, (h) triarylphosphites having from 6 to 24 carbon atoms in each aryl group, and (i) halogen-containing organo phosphorus compounds of the formula $PX_{3-a}(OR^3)_a$,

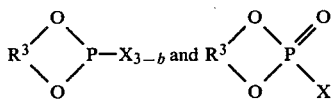

where $R^3$ is an aryl group containing from 6 to 20 carbon atoms, X is a halogen, a is 1 or 2, and b is 0 or 2 to form a milled composite wherein the molar ratio of (1) to (2) ranges from 4:1 to 100:1;

(3) treating the composite thus obtained from (1) and (2) with a tetravalent titanium halide for a period of time sufficient to incorporate titanium tetrahalide on at least a portion of the surface of said milled composite; and B. a cocatalyst component B comprising at least one organoaluminum compound wherein the molar ratio of component B to titanium compound ranges from 0.5:1 to 2,000:1 and the amount of titanium present in the finished catalyst ranges from about 0.1 to about 10 weight percent based on the dry composite.

2. A catalyst according to claim 1 which additionally contains an aromatic ester as part of cocatalyst component b, said aromatic ester being represented by the formula

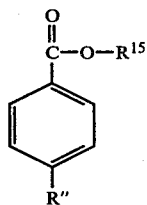

wherein $R^{15}$ represents alkyl groups having from 1 to about 4 carbon atoms and wherein R'' represents monovalent radicals selected from the group consisting of —F, —Cl, —Br, —I, —OH, —OR', —OOCR', —SH, —NH$_2$, —NR$_2$', NO$_2$, —CN, —CHO, —COR', —COOR', —CONH$_2$, CONR$_2$', —SO$_2$R', —CF$_3$, —NHCOR', and hydrogen.

3. A catalyst according to claim 2 wherein the molar ratio of B to aromatic ester is about 1:1 to 8:1.

4. A catalyst according to claim 1 wherein 2d is a ketone of the formula

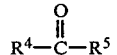

wherein $R^4$ is thiophene, and $R^5$ is an aryl group containing from 6 to 20 carbon atoms.

5. A catalyst according to claim 1 wherein (1) is MgCl$_2$ and (3) is TiCl$_4$.

6. A catalyst according to claim 5 wherein B is triethylaluminum and the catalyst additionally contains ethyl anisate.

7. A catalyst according to claim 6 wherein the catalyst adjuvant is triphenyl phosphite or phenol.

8. A catalyst according to claim 6 wherein a catalyst adjuvant is selected from triphenoxyaluminum, triphenylborate, triphenyl phosphite, diphenyl phosphite, p-phenylphenol, p-chlorophenol, p-methylphenol, 2-cyclohexylphenol, 2,6-di-t-butyl-4-methylphenol, di-n-octadecyl(3,5-di-t-butyl-4-hydroxybenzyl)phosphonate, 2-naphthol, 1-naphthol, 2-benzoylthiophene, triphenylsilanol, triphenylphosphine oxide, triphenyl phosphate, d-carvone, l-carvenone, catechylphosphotrichloride, diphenylphosphorochloridate, phenylphosphorodichloridite, o-phenylenephosphorochloridate, 2-phenylphenol.

9. A catalyst according to claim 1 further including a solid particulate material which is inert to the catalyst components.

10. A catalyst according to claim 9 wherein the solid particulate material is selected from silica, alumina, calcium carbonate and solid organic material selected from polyvinyltoluene, polycarbonate, polyethylene, polypropylene, polystyrene, polymethylmethacrylate and mixtures thereof.

11. A catalyst according to claim 10 wherein said solid particulate materials are milled in the presence of (1) and (2).

12. A catalyst according to claim 1 wherein the catalyst composite obtained after treating the product of (1) and (2) with (3) is washed with an inert solvent to remove excess titanium tetrahalide and the resulting composite is dried prior to combining with cocatalyst component B.

13. A catalyst according to claim 1 wherein (1) is MgCl$_2$, (2) is triphenoxyaluminum or triphenylborate, (3) is TiCl$_4$ and B comprises triethylaluminum and ethyl anisate.

14. A catalyst according to claim 1 wherein (1) is MgCl$_2$, (2) is diphenyl phosphite, (3) is TiCl$_4$ and B comprises triethylaluminum and ethyl anisate.

15. A catalyst according to claim 1 wherein (1) is MgCl$_2$, (2) is p-phenylphenol, p-chlorophenol, p-methylphenol, 2-cylohexylphenol, 2,6-di-t-butyl-4-methylphenol, 2-naphthol, 1-naphthol, or 2-phenylphenol, (3) is TiCl$_4$ and B comprises triethylaluminum and ethyl anisate.

16. A catalyst according to claim 4 wherein (1) is MgCl$_2$, (2) is 2-benzoylthiophene, (3) is TiCl$_4$ and B comprises triethylaluminum and ethyl anisate.

17. A catalyst according to claim 1 wherein (1) is MgCl$_2$, (2) is triphenylsilanol, (3) is TiCl$_4$ and B comprises triethylaluminum and ethyl anisate.

18. A catalyst according to claim 1 wherein (1) is MgCl$_2$, (2) is triphenylphosphine oxide or triphenyl phosphate, (3) is TiCl$_4$ and B comprises triethylaluminum and ethyl anisate.

19. A catalyst according to claim 1 wherein (1) is MgCl$_2$, (2) is d-carvone or l, carvenone, (3) is TiCl$_4$ and B comprises triethylaluminum and ethyl anisate.

20. A catalyst according to claim 1 wherein (1) is MgCl$_2$, (2) is triphenyl phosphite, and B comprises triethylaluminum, ethyl anisate and diethylaluminum chloride.

21. A catalyst according to claim 1 wherein (1) is MgCl$_2$, (2) is catechylphosphotrichloride, diphenylphosphorochloridate, phenylphosphorodichloridite, or o-phenylenephosphorochloridate, (3) is TiCl$_4$ and B comprises triethylaluminum and ethyl anisate.

* * * * *